United States Patent [19]

Landry

[11] 4,123,306
[45] Oct. 31, 1978

[54] METHOD AND SYSTEM FOR RETREADING TIRES UTILIZING RF ENERGY

[75] Inventor: Robert G. Landry, Lewiston, Me.

[73] Assignee: Long Mile Rubber Company, Dallas, Tex.

[21] Appl. No.: 755,484

[22] Filed: Dec. 29, 1976

[51] Int. Cl.² .................. B29H 5/04; B29H 17/36
[52] U.S. Cl. .................. 156/96; 156/73.1;
    211/23; 219/10.53; 219/10.55 R; 219/10.63;
    224/42.12; 264/23; 425/174.2
[58] Field of Search .................. 156/96, 73.1, 123 R,
    156/128 R, 272–275, 380, 394; 219/10.53,
    10.63, 10.69, 10.81, 10.57, 10.55; 425/41, 174;
    264/22, 23, 25–27; 224/42.12, 42.06, 42.21,
    42.26–42.3; 211/20, 21, 23, 24; 254/50.1–50.4, 2
    R, 3 R

[56] References Cited

U.S. PATENT DOCUMENTS

| | | | |
|---|---|---|---|
| 2,421,096 | 5/1947 | Vogt | 264/36 |
| 2,434,573 | 1/1948 | Mann et al. | 156/273 |
| 2,558,535 | 6/1951 | Billings | 211/23 |
| 2,594,139 | 4/1952 | Enabnit | 425/50 |
| 2,738,406 | 3/1956 | Zaleski | 219/10.57 |
| 2,766,362 | 10/1956 | Kinder et al. | 219/10.53 |
| 3,236,709 | 2/1966 | Carver | 156/96 |
| 3,521,860 | 7/1970 | Zehrung et al. | 254/3 |
| 3,867,606 | 2/1975 | Peterson | 219/10.55 |
| 3,878,023 | 4/1975 | Dexter | 156/96 |
| 3,926,711 | 12/1975 | Wolfe | 156/96 |
| 3,956,053 | 5/1976 | Staats | 156/272 |
| 3,989,563 | 11/1976 | Schelkmann | 156/96 |
| 4,013,499 | 3/1977 | Benigni | 156/96 |

Primary Examiner—John E. Kittle
Attorney, Agent, or Firm—Richards, Harris & Medlock

[57] ABSTRACT

The specification discloses a method and system for retreading tires wherein an uncured gum layer disposed between a vehicle tire carcass and a pre-cured tire tread is vulcanized by RF energy. An annular air bladder is received within the tire carcass and includes an annular conductive grounding strip. A hub is received within the center opening of the tire carcass and connects to the grounding strip. A chamber capable of withstanding high pressures is dimensioned to receive the tire carcass. A shaft is horizontally rotatably disposed in the chamber and is adapted to connect to the hub. Drive structure extends through the wall of the chamber in order to rotate the shaft at a predetermined speed. A source of pressure is provided for pressurizing the interior of the chamber. An RF antenna extends from the chamber to a position adjacent the tire tread when the tire carcass is mounted for rotation about the shaft. A source of RF energy is located outside the chamber. A path is formed for the RF energy through the wall of the chamber in order to energize the antenna, such that RF energy is directed through the tire tread to heat the gum layer to an extent sufficient to vulcanize the tire tread to the tire carcass.

47 Claims, 20 Drawing Figures

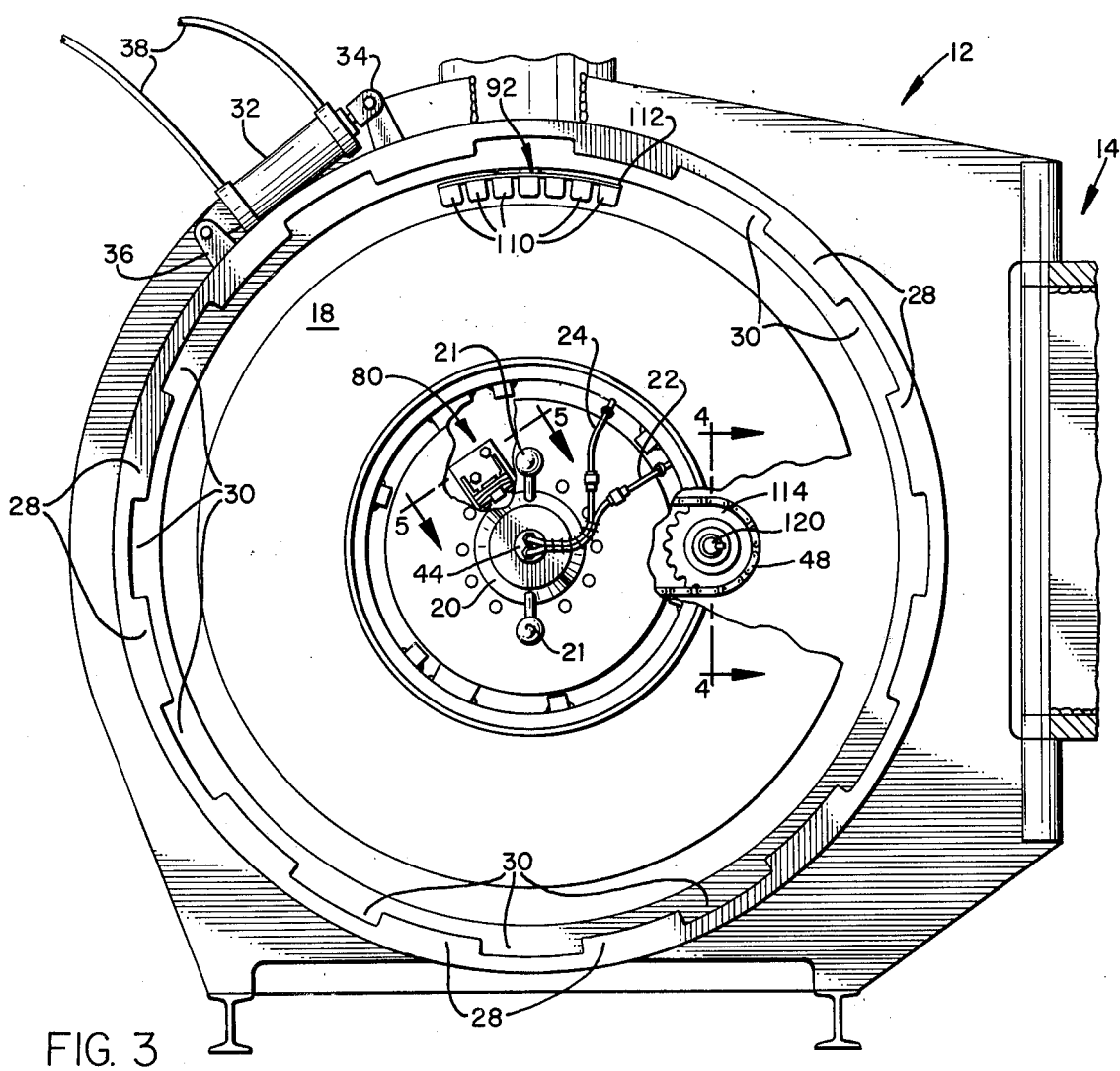
FIG. 3
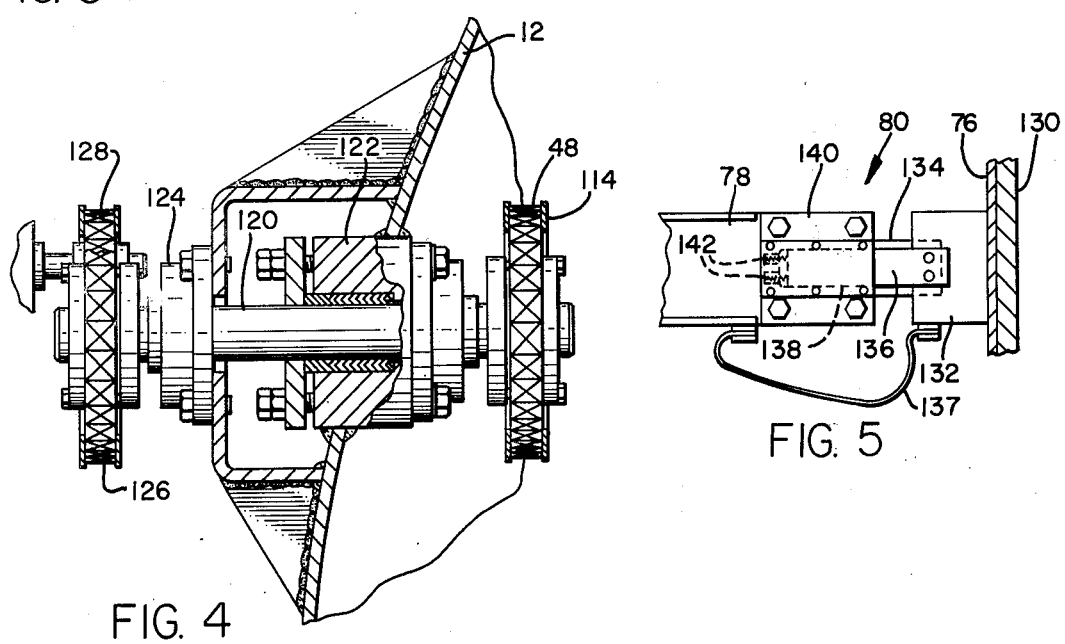
FIG. 4
FIG. 5

METHOD AND SYSTEM FOR RETREADING TIRES UTILIZING RF ENERGY

FIELD OF THE INVENTION

This invention relates to the retreading of tires, and more particularly relates to the vulcanizing by RF energy of an uncured gum layer which is disposed between a vehicle tire carcass and a pre-cured tire tread.

THE PRIOR ART

The retreading of vehicle tires is presently a large industry. Conventionally, to prepare a tire for retreading, the remaining tread of the tire is removed by buffing or the like. The remaining tire carcass is then wrapped about its periphery with a layer of uncured gum rubber and a length of pre-cured tire tread is cut and affixed around the gum rubber layer. The tire assembly is then placed in a pressurized chamber and high temperature steam is then applied to the chamber. The gum rubber layer is vulcanized by the pressure and steam to provide a retreaded tire.

While such previously developed retreading systems provide retreaded tires with long wear capabilities, the previous techniques are relatively time consuming, thereby limiting the number of tires which can be retreaded in a day and increasing the cost of the retreading process. Moreover, such previously developed steam heating retreading systems require a steam boiler and other attendant expensive steam handling equipment. Part of the difficulties with such prior steam heating systems is that they tend to heat up not only the gum rubber layer, but also the entire tire carcass. This results in lengthening the time required for vulcanizing and imposes the application of unnecessary heat to the tire carcass. In some instances, such unnecessary heating may tend to cause the deterioration of the tire carcass and requires expenditure of unnecessary energy.

A need has thus arisen in the tire retreading industry for a system which can very quickly vulcanize a pre-cured tire tread to a tire carcass in a safe and economical manner, without the required use of steam. The present invention provides such a system by utilizing RF energy which heats in a controlled manner the gum rubber layer to be vulcanized. The present invention thus eliminates the requirement of steam heating and enables retreading to be accomplished much faster than with conventional techniques.

It has been heretofore known to heat rubber articles such as vehicle tires with the use of microwave energy. Examples of such techniques are disclosed in an article entitled "Giant Tire Microwave System" by W. Val Smith et al, published in *Rubber Age Magazine* in June of 1975, Pages 43-45; and in U.S. Pat. No. 3,867,606 by Robert A. Peterson; U.S. Pat. No. 3,846,606 by Richard H. Edger; U.S. Pat. No. 3,770,931 by Charles Gilliett; U.S. Pat. No. 3,745,291 by Robert A. Peterson et al; and U.S. Pat. No. 2,738,406 by Zaleski. However, such previously disclosed microwave techniques have generally been utilized only to preheat a tire prior to subsequent conventional molding and vulcanizing. The preheated tire is then required to be removed from the microwave chamber and placed in a conventional steam heating molding or retreading chamber. Rather than decreasing the amount of equipment required for retreading, such prior systems have thus doubled the required equipment and have not substantially reduced the time required for tire retreading.

Not only have such prior microwave systems not been recognized as being capable of use for an entire retreading process, the prior equipment has also not been constructed so as to enable retreading, inasmuch as they have not included structure for either pressurizing the tire or the chamber.

Such systems as disclosed in the Gilliett and Zaleski patents noted above have been for the purpose of vulcanizing an entire "green" tire and have not been used to retread tires. Some microwave systems have required tires to be filled with a conductive fluid or have required large high conductivity discs which contact the tire. Such prior techniques have thus required the entire body of the tire to be heated, thereby rendering the technique impractical for tire retreading. Moreover, such previously developed microwave heating systems have generally required the use of relatively high frequency waves which requires a relatively expensive microwave generator and expensive shielding to prevent danger to the operator.

SUMMARY OF THE INVENTION

In accordance with the present invention, a system for retreading tires includes a chamber dimensioned to receive at least one tire having an uncured gum layer and a pre-cured tread disposed about the outer periphery thereof. Structure is provided for pressurizing the interior of the chamber. An antenna is disposed within the chamber adjacent the outer periphery of the tire. Structure is provided for rotating the tire such that the periphery of the tire cyclically passes the antenna. RF energy is applied to the antenna such that the uncured gum layer is heated sufficiently to become vulcanized to affix the pre-cured tread to the tire.

In accordance with another aspect of the invention, a system for vulcanizing an uncured gum layer disposed between a vehicle tire carcass and a pre-cured tire tread includes an annular air bladder for being received within the tire carcass. A hub housing is also received within the center opening of the tire carcass. A chamber capable of withstanding high pressures is dimensioned to receive the vehicle tire carcass. A shaft is disposed rotatably and horizontally in the chamber and is dimensioned to receive the hub housing. Drive structure extends through the wall of the chamber for rotating the shaft. Structure is provided to pressurize the interior of the chamber. An antenna extends from the chamber to a position adjacent the tire tread. A source of RF energy is located outside the chamber. Structure connects the RF source through the wall of the chamber to the antenna, such that RF energy is directed through the tire tread to heat the gum layer to an extent sufficient to vulcanize the tire tread to the tire carcass.

In accordance with yet another aspect of the invention, a system for vulcanizing an uncured gum layer disposed between a vehicle tire carcass and a pre-cured tire tread includes a chamber capable of withstanding high pressures and includes a pivotal side door. An axle is centrally located in the chamber and is mounted for horizontal rotation therein. A drive shaft extends through the side wall of the chamber and is spaced from the axle. Structure exterior to the chamber is provided to rotate the drive shaft. Structure within the chamber is provided to transfer rotation of the drive shaft to the axle. A hub assembly is adapted to be secured to the interior of the vehicle tire carcass to be affixed to the end of the axle, such that the tire carcass is vertically oriented. Structure is provided to pressurize the interior of the chamber. An antenna is disposed within the chamber from the top of the chamber and is operable to be selectively positioned adjacent the upper portion of the tire tread. A source of RF energy is located exterior to the chamber. The RF energy is fed from the source through the side walls of the chamber to the antenna, such that RF energy is applied from the antenna through the tire tread to heat the gum layer sufficiently to vulcanize the tire tread to the tire carcass.

In accordance with yet another aspect of the invention, an antenna for applying RF energy to a rotating tire within a pressurized chamber includes an antenna element having a configuration to generally conform with a portion of the outer periphery of the rotating tire. At least one wheel is attached to the antenna for abutting with the rotating tire in order to maintain the antenna a predetermined distance from the outer periphery of the rotating tire. Structure is associated with the antenna and extends through the walls of the chamber for applying RF energy to the antenna. An insulating member is pivotally connected to the antenna on the opposite side of the RF antenna from the rotating tire. A support member is pivotally attached to the insulating member and is disposed to support the antenna within the chamber.

In accordance with yet another aspect of the invention, a tire retreading system is provided wherein RF energy is applied to a rotating tire casing in order to vulcanize a pre-cured tread to the tire casing. The combination includes an annular air bladder disposed within the tire casing and operable to be inflated in order to pressurize the interior of a tire casing. An annular RF conductive member is disposed between the air bladder and the inner periphery of the tire casing. Structure is provided to connect the conductive member to circuit ground.

In accordance with yet another aspect of the invention, a tire lifting and positioning system includes a frame having wheels and an upright member. A lever is pivotally connected at one end to the support member. Tire hooking structure is formed on the other end of the lever and is dimensioned to be attachable to a hub on a vertically oriented tire. A fluid cylinder is connected between the frame and the lever. Structure is provided for operating the fluid cylinder to raise or lower the tire structure on the lever, such that a tire may be lifted by the lever to a raised vertical position.

In accordance with yet another aspect of the invention, a method of retreading tires includes the steps of removing an old tread from a tire casing and applying a length of uncured cushion gum about the outer periphery of the tire casing. A length of a pre-cured tread is then applied about the outer periphery of the cushion gum. An RF grounding member is positioned about the inner periphery of the tire casing. An inner tube or bladder is positioned within the tire casing. The tire casing is then mounted on a hub. The hub is then mounted on an axle within a pressure chamber and the pressure chamber is pressurized. The axle is rotated to rotate the tire casing within the pressure chamber. RF energy is applied to an antenna fixedly disposed adjacent the rotating tire casing. The RF energy has a magnitude sufficient to vulcanize the cushioned gum in order to affix the pre-cured tire tread to the tire casing.

DESCRIPTION OF THE DRAWINGS

For a more complete understanding of the present invention and for further objects and advantages thereof, reference is now made to the following description taken in conjunction with the accompanying Drawings, in which:

FIG. 3 is a front view of the chamber shown in FIG. 2 including a tire mounted therein, with a portion of the tire and hub assembly broken away for clarity of illustration;

FIG. 4 is a sectional view taken along the section lines 4—4 in FIG. 3 illustrating the connection of a drive shaft to the rear wall of the chamber;

FIG. 5 is a top view of the commutating brush assembly of the present invention;

DESCRIPTION OF THE PREFERRED EMBODIMENT

Figure 1:
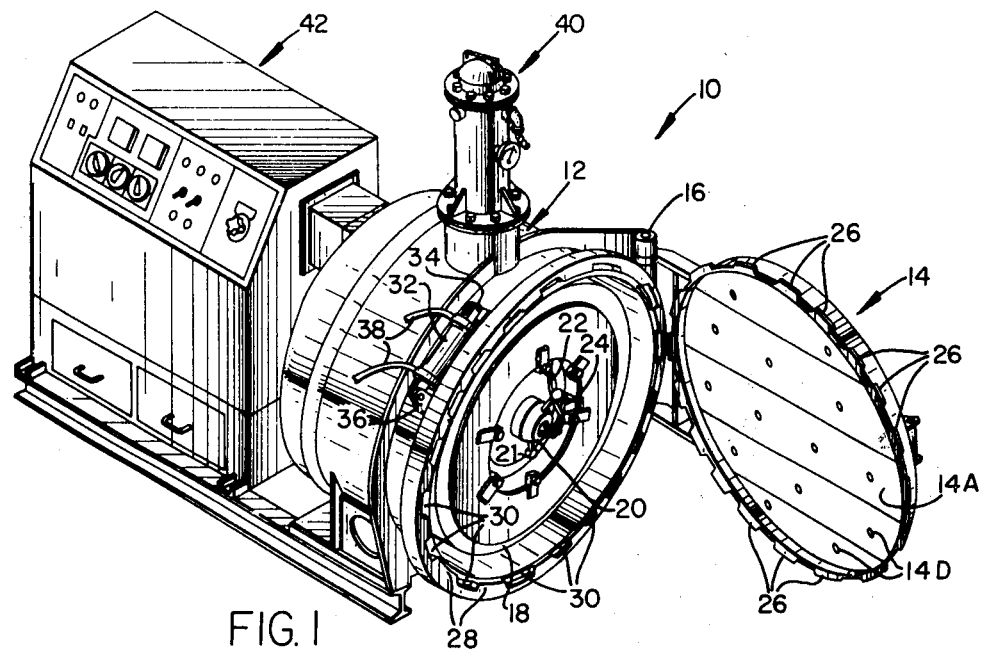
FIG. 1 is a perspective view of the RF tire retreading system of the present invention.

Referring to FIG. 1, a perspective view of the present RF tire retreading system is illustrated generally by the numeral 10. The system includes a pressure chamber 12 having a front door 14 pivotally connected at vertical hinges 16. Door 14 includes an inner cover 14A which reduces the effective volume of the chamber. Chamber 12 is dimensioned to receive a vehicle tire to be retreaded. In FIG. 1, a relatively large truck tire 18 is illustrated as being mounted within the chamber 12, although it will be understood that smaller vehicle tires may also be accommodated. Tire 18 is mounted on a shaft or axle which is rotatable within the chamber 12 in order to rotate the tire 18 past a fixed RF antenna.

Tire 18 is mounted on the rotating shaft by a lock nut 20 which is threadably attached to the end of the shaft. Knobs 21 are attached to the nut 20 for ease of tightening. A flexible conduit 22 directs pressurized air received from passageways in the shaft in order to inflate a bladder or inner tube within the tire 18 to a predetermined pressure. As will be subsequently described, the tire 18 is covered with a flexible annular envelope or shield and is mounted on a split hub housing to facilitate mounting within the chamber. A flexible conduit 24 is provided in order to apply vacuum drawn through passageways in the shaft to a space between the annular shield and the exterior of the tire in order to remove air and moisture therefrom. Although only one tire is shown mounted within chamber 12, it will be understood that additional tires could be mounted within the chamber in order to retread several tires simultaneously.

The door 14 includes projections 26 spaced about the outer periphery thereof. An annular member 28 is rotatably mounted about the chamber 12 and includes grooves 30 formed about the periphery thereof for receiving the projections 26. A hydraulic or pneumatic cylinder 32 is connected to chamber 12 at a pivot 34. Cylinder 32 is connected by member 36 to the rotatable annular member 28. Pneumatic air line 38 is connected to a source of air or fluid pressure, not shown, in order to actuate the cylinder 32. When the door 14 is shut, grooves 30 receive projections 26. The cylinder 32 is then actuated to rotate the annular member 28 to a position wherein the projections 26 no longer coincide with grooves 30. This causes the door 14 to be latched in position so as to withstand high interior pressures.

An antenna positioning housing 40 is disposed on the top portion of the chamber 12 and contains a hydraulic cylinder, as will be subsequently described, which operates to raise and lower the RF antenna. A housing 42 is attached to the rear of the chamber 12 and contains sources of air pressure for applying pressurized air to the interior of the tire and also to the interior of the chamber. Housing 42 also contains a source of vacuum for applying vacuum to conduit 24. Housing 42 also contains various metering devices for enabling metering of various temperatures within the chamber and upon the tire through the use of suitable probes, if desired. Housing 42 further includes a source of RF energy which applies RF energy to the RF antenna located within the chamber 12. Also included in housing 42 is a hydraulic or electrical motor for providing rotation to the shaft within the chamber, as will be subsequently shown. Various servo mechanisms to be subsequently described are also included in housing 42 in order to enable automation of various steps of the operation in accordance with the present method.

Figure 2:
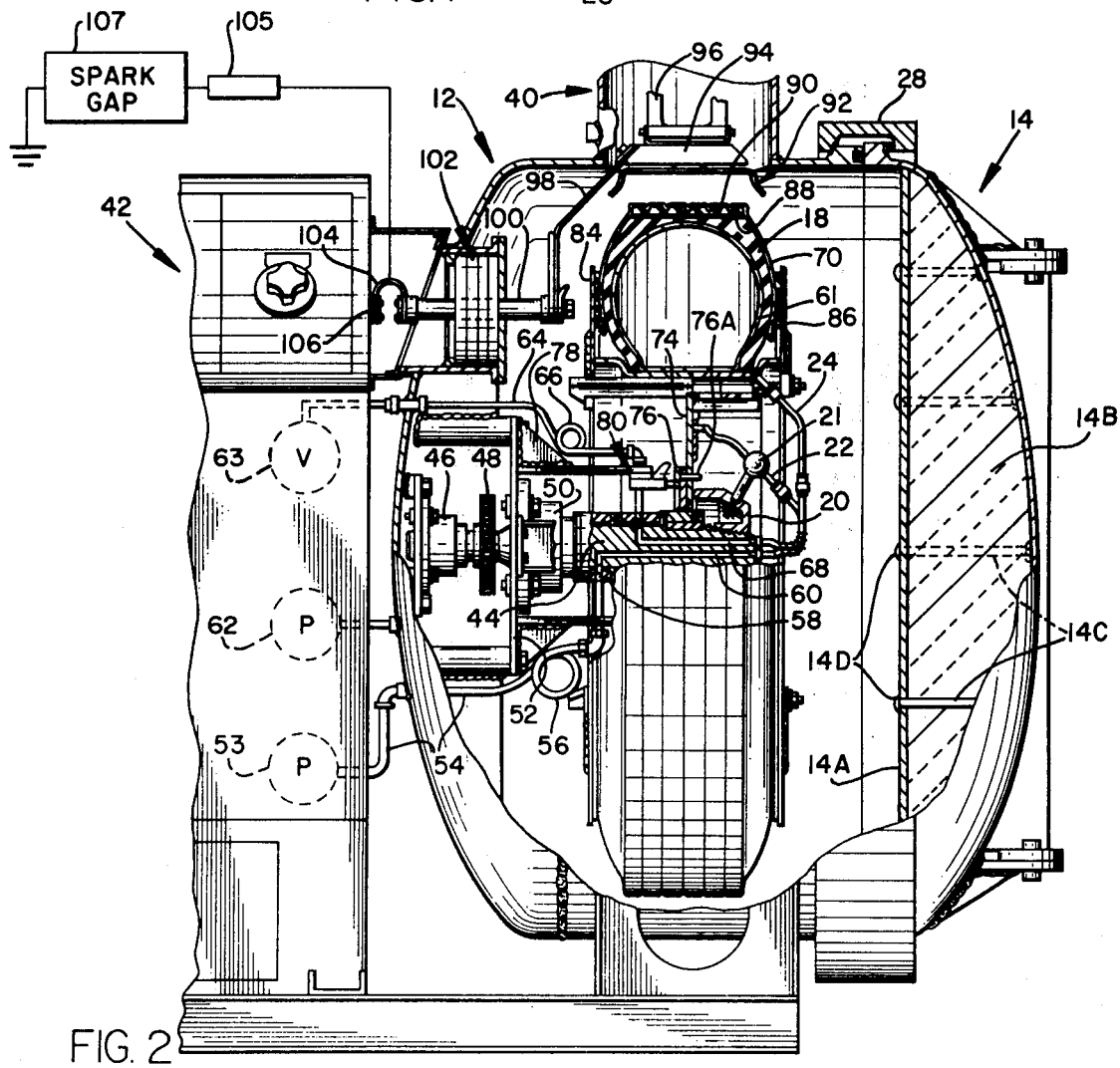
FIG. 2 is a partially sectioned side view of the chamber portion of the system shown in FIG. 1 with a tire mounted therein.

FIG. 2 is a partially sectioned view of the chamber 12 and the tire 18 which illustrates how the rotatable annular ring 28 locks the door 14 to the chamber 12. The rotatable axle or shaft 44 is horizontally mounted within the chamber 12 in a bearing 46 which is affixed to the rear of the interior chamber wall. An endless chain 48 is driven by a driving shaft, to be subsequently shown, to rotate a sprocket attached to shaft 44. Shaft 44 is thus rotated at a predetermined speed in order to rotate the tire 18 within the chamber. Shaft 44 is also journaled in a bearing 50 which is mounted on a support plate 52 within the chamber.

In order to reduce the effective volume of the chamber to reduce the heating and pressure requirements, the inner cover 14A is held in place by tie rods 14C which are affixed to the door 14. The space between door 14 and inner cover 14A is filled with insulating material. The ends of tire rods 14C are secured to the inner cover by acorn nuts 14D.

A pressure pump 53 within the housing 42 applies pressure to a pressure line 54 extending through the rear wall of the chamber and through an expansion loop 56 to communicate with a sleeve 58. The sleeve 58 is stationary and encircles shaft 44. An aperture in sleeve 58 communicates with a pressure passageway 60 formed through the shaft 44. The pressure passageway 60 communicates with conduit 22 which is connected to pressurize an interior air bladder or inner tube 61 disposed within the tire 18. In addition, a second pressure pump 62 is disposed in housing 42 to supply pressurized air through the rear chamber wall in order to pressurize the chamber interior. If desired, a separate source of air pressure located outside housing 42, and including suitable regulators, could be used to supply a source of pressure for both chamber 12, as well as the interior air bladder 61. A source of vacuum 63 is located within the housing 42 and communicates with a vacuum line 64 which extends through the rear wall of the chamber 12 and through an expansion loop 66 to another aperature in sleeve 58. The aperture in sleeve 58 communicates with a vacuum passageway 68 formed through the shaft 44. Passageway 68 is connected with the conduit 24 which applies vacuum between the tire 18 and an annular flexible envelope 70 attached about the tire 18.

An important aspect of the present invention, as will be subsequently described, is that a conductive RF ground element is disposed about the inner periphery of the tire 18. Conductive straps from the conductive member extend into contact with a metal split tire hub member 74. A ground ring 76 contacts the split tire hub 74. Dowel pins 76A operate to properly position the tire assembly. A support member 78 supports a grounding brush assembly 80 which maintains contact with the ground ring 76 during rotation of the tire. In this way, circuit ground is provided to the RF signals and without passage through bearings 46 and 50, even though the tire rotates during application of RF energy. This enables focusing of the RF energy to provide greatest heat to the gum layer.

An important aspect of the present invention is that pressure sources 53 and 62 are coordinated in operation such that the inner tube 61 always is provided with a greater pressure than the pressure applied to the interior of chamber 12. This keeps the tire 18 from collapsing and also prevents distortion of the tire during rotation. Preferably, the interior of the inner tube 61 is maintained at 15 psi greater than the pressure within the chamber 12.

Further referring to FIG. 2, the split hub assembly mounted in the center of the tire carcass 18 includes annular pressure plates 84 and 86 which bear against the sides of the annular envelope 70. Prior to installing the tire assembly within the chamber 12, an uncured cushion gum layer 88 is disposed about the buffed tire carcass 18 and a pre-cured tire tread 90 is disposed over the gum layer 88. The envelope 70 is then fitted over the tread and extends over the sides of the tire. Application of a vacuum suction through conduit 24, in association with the high pressure introduced within the chamber 12, causes the envelope 70 to generally conform with the exterior configuration of the tread 90. The envelope 70 eliminates side edge lifting of the tire tread 90 from the tire carcass and assists in maintaining the tire tread 90 in the desired position during curing thereof. The vacuum suction also assists in removal of moisture which facilitates the RF action.

An RF antenna 92 is provided with a cross section having a shape which generally corresponds to the cross-sectional shape of the tire 18. Antenna 92 is mounted on a conductive antenna holder 94 which in turn is connected to an insulating member 96. The antenna holder 94 is connected to a flexible conductive loop 98 which is connected to a conductive feed-through 100. Feed-through 100 includes an interior conductive member surrounded by an insulating sleeve which extends through a nonconductive insulator 102 in the rear wall of the chamber 12. The flexible conductive expansion feed 104 is connected to a power outlet feed 106 which connects to the output of the RF generator within the housing 42.

An RF choke 105 is connected to the RF feed 104 in order to prevent RF energy from being applied to a spark gap 107 which is connected between the choke 105 and circuit ground. High voltage D.C. static changes which tends to build up due to the electrical flux between the antenna 92 and the rotating tire assembly is thus discharged through the spark gap 107. When the DC static charge builds to an unacceptable level, the charge is dissipated through the spark gap, thereby tending to eliminate arcing between the antenna 92 and the tire assembly.

In this manner, RF energy is applied from the power outlet feed 106 through the expansion feed 104, through the feed-through 100 and loop 98 to the antenna 92. RF energy is then focused through the flexible envelope 70 and through the tire tread 90 in order to apply heat to the uncured cushion gum layer 88. In this manner, gum layer 88 is vulcanized in order to strongly bond the tread 90 to the tire carcass. Due to the rotation of the tire in the chamber 12, the energy provided by the RF antenna is swept around the entire periphery of the tire, thereby providing adequate heat for vulcanizing of the cushion gum layer 88 without excessively heating one area of the tire over another and without excessive RF energy requirements.

FIG. 3 is a front view of the chamber 12 with the door 14 in the open position. The antenna 92 includes a plurality of generally U-shaped members 110 spaced apart along a support member 112 which has a curvature generally corresponding to the tire being retreaded. FIG. 3 also illustrates a drive sprocket 114 which is rotated by a drive shaft which extends through the rear wall of the chamber 12. The endless chain 48 is moved by the sprocket 114 to rotate the shaft 44 in the manner previously described.

FIG. 3 also illustrates the lock nut 20 which includes knobs 21 on opposite ends thereof to enable manual tightening of the tire to the end of the shaft 44. The brush assembly 80, as previously noted, provides continuous circuit ground to the conductive member disposed between the bladder 61 and the tire carcass previously described.

FIG. 4 illustrates in greater detail a sectional view of the drive shaft, taken generally along the section lines 4—4 in FIG. 3. The drive shaft 120 extends through a packing gland 122 which is mounted through the rear wall on the chamber 12. The sprocket 114 is mounted on the end of shaft 120 and the endless chain 48 is reaved over sprocket 114. The rear end of the shaft 120 extends through a bearing 124 and is connected with a rear sprocket 126. Sprocket 126 receives driving motion from a chain 128 which in turn is driven by an output shaft from a motor located within the housing 42.

FIG. 5 is an enlarged view of the top of the brush assembly 80. The ground ring 76 is connected on a hub member 130 which is connected to the split tire hub member 74. The brush 132 brushes against the ground ring as the ground ring rotates with the tire. A ground strip 134 is connected to the support member 78 and to the chamber 12 to circuit ground. A projection 136 is attached to the brush 132 and extends within a cavity 138 formed in brush housing 140. Springs 142 are disposed between the bottom of cavity 138 and the projection 136 in order to constantly maintain the brush 132 against the grounding ring 76. A flexible ground strap 137 is attached from the brush 132 to the support member 78 so that the RF energy does not flow through springs 142, but to the support member and chamber 12 ground direct.

Figure 6:
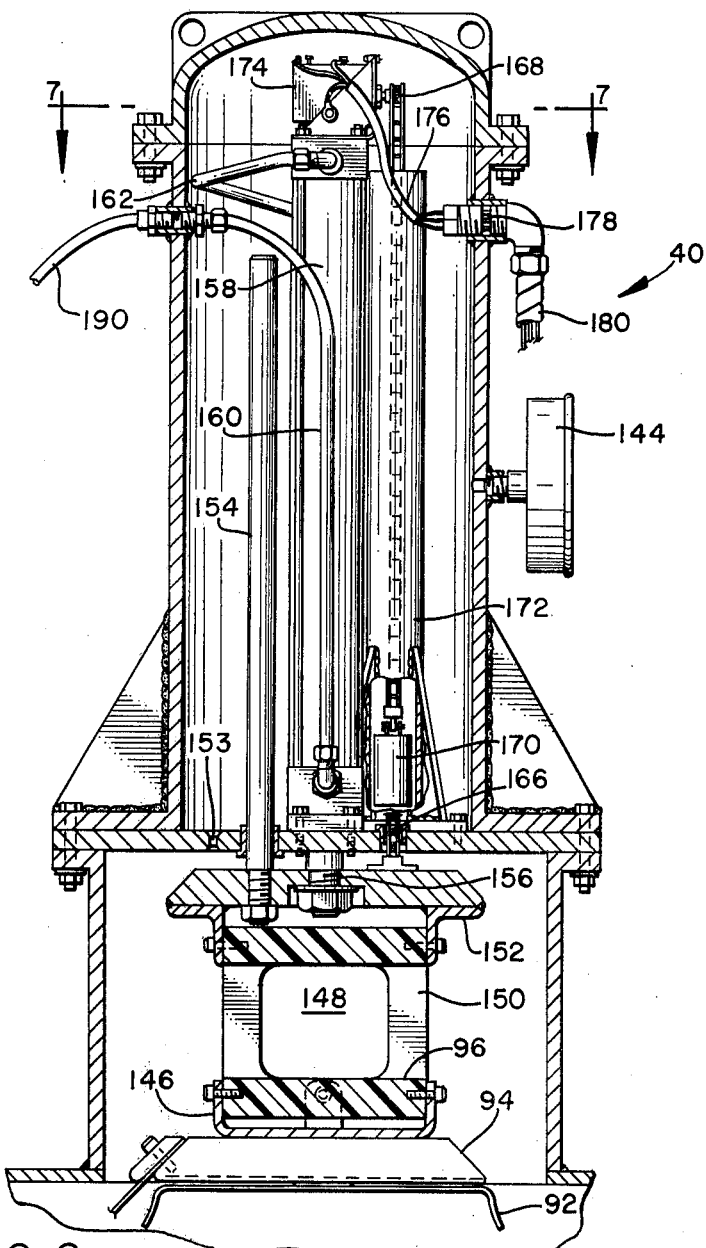
FIG. 6 is a partially sectioned view of the vertical adjustment assembly for the RF antenna.

FIG. 6 is a sectional view of the antenna adjustment housing 40 which includes a mechanism for raising and lowering the RF antenna 92. Housing 40 includes a pressure gauge 144 which provides an indication of the pressure within housing 40 and also of the pressure within the pressure chamber 12. The antenna holder 94 is made from highly conductive material and is attached to a generally U-shaped metal holder bracket 146. The antenna insulator 96 is made from insulating material such as plastic or the like and includes apertures 148 formed therethrough to define small section arms 150 to eliminate RF feed-through. A vent aperture 153 provides communication between the pressure chamber 12 and the housing 40. An actuator bracket 152 is connected to the top of the insulator 96 and is rigidly connected to a guide rod 154 and to a fluid cylinder output rod 156. The fluid cylinder 158 is disposed vertically within the housing 40 and includes fluid pressure lines 160 and 162 which receive either pressurized fluid air or hydraulic fluid in order to operate the cylinder 158. Pressurized fluid admitted to line 160 causes the shaft or rod 156 to be raised, while fluid pressure applied to line 162 causes the rod 156 to be lowered in order to lower the antenna 92.

An important aspect of the present invention is to accurately position the antenna 92 is order to provide the desired heating while eliminating arcing and the like. To accomplish such accurate positioning, a chain 166 is connected at one end to the actuator bracket 152. The chain 166 is reaved over several sprockets including a top sprocket 168 and the other end of the chain is tied to a weight 170. Weight 170 is adapted to move up and down within a weight guide tube 172. The sprocket 168 is connected to a potentiometer 174, the output of which is applied through wires 176 through a pressure feed-through plug 178 to wires 180. Wires 180 run through a meter which displays the resistance of the potentiometer 174.

It will be apparent that as the RF antenna 92 is moved up or down by operation of the fluid cylinder 158, the chain 166 will cause rotation of the sprocket 168. Rotation of sprocket 168 causes a change in the electrical resistance connected to wires 176 and 180, therefore causing a displacement of the meter attached to wire 180. The meter may be calibrated in inches-millimeters between the antenna and the tire tread. The operator, by watching the operation of the potentiometer, may very accurately position the antenna adjacent the tire treads. Such accurate adjustment is required since different size tires are to be used within the chamber, and inasmuch as some tires are not symmetrical. The output applied via wire 180 is also utilized in the automatic servo mechanism system utilized to automatically control the present system, as will be subsequently described.

Figure 7:
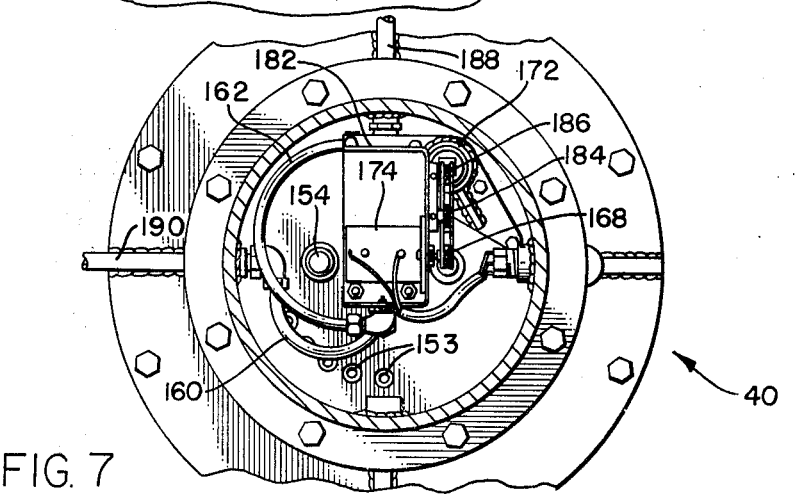
FIG. 7 is a sectional view taken generally along the sections 7—7 of the system shown in FIG. 6.

FIG. 7 is a sectional view taken generally along the section lines 7—7 in FIG. 6 of the housing 40. In this view, the potentiometer 174 may be seen to be mounted upon a bracket 182. Bracket 182 supports the sprocket 168 which controls the potentiometer 174. Two additional sprockets 184 and 186 are also supported by the bracket 182 and the chain 166 is disposed under sprocket 184 and over sprocket 186 in order to provide accurate movement of the chain. The sprocket 186 is disposed directly over the weight tube 172.

A pressure line 188 is disposed through the housing 40 for communication with the pressure line 162 in order to cause the cylinder 158 to move the antenna 92 down. The pressure line 160 is connected through a feed-through pipe 190 in order to receive pressure to move the antenna 92 upwardly.

Figure 8:
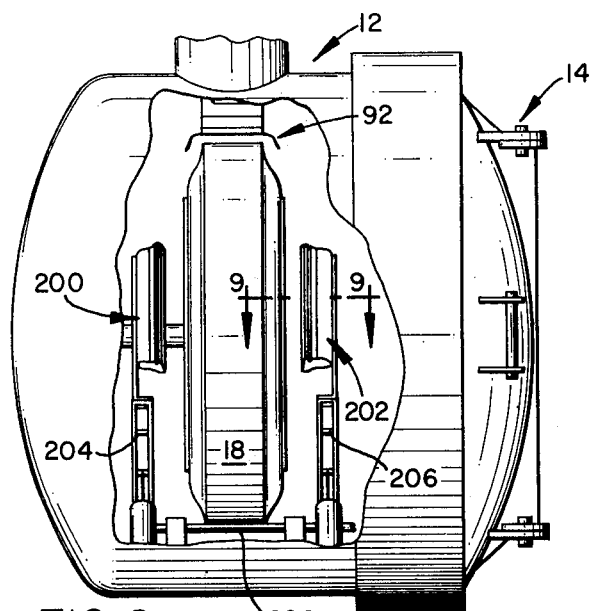
FIG. 8 is a partially broken away side view of the chamber illustrating electrical heating elements.

Referring to FIG. 8, a side view of the chamber 12 is illustrated, with the door 14 in the closed position and with portions of the side walls of the chamber being broken away for clarity of illustration. Details of the interior of the chamber are omitted, with only the tire 18 being shown with heating elements 200 and 202. Heating element 200 is connected to the support member 204, while heating element 202 is connected to a support member 206. Two other like heating elements are disposed on the other side of the tire 18, in a manner to be subsequently described. The support members 204 and 206 are pivotally mounted on a shaft 208 in order to enable adjustment of the heating elements 200 and 202 adjacent the edge portion of various tires of different shapes. Heating elements 200 and 202 are preferably electrically energized heating elements which are utilized to prevent heat loss by the gum rubber 88 along its edge by heat transfer to the inside of the envelope 70, and generally into the pressurized gas of the chamber 12.

Figure 9:
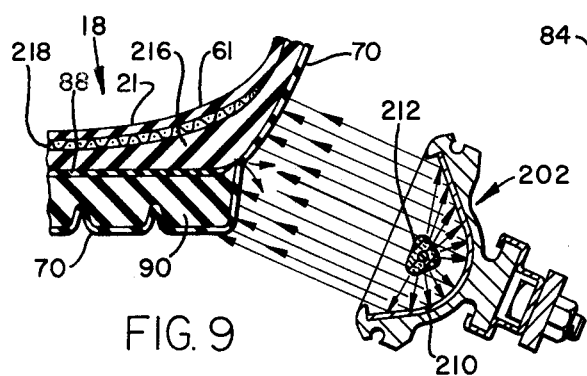
FIG. 9 is a sectional view taken generally along the section lines 9—9 of the system shown in FIG. 8.

FIG. 9 is a sectional view of the heating element 202 taken generally along the section line 9—9 of FIG. 8. As may be seen from FIG. 9, the heating element 202 comprises a polished aluminum parabolic reflector 210 which focuses the heat generated from a filament 212.

The tire 18 includes a tire carcass 216, a layer of uncured cushion gum 88, a pre-cured tire tread 90 and the flexible envelope 70. In addition, a metallic annular conductive member 218 is disposed between the tire carcass 216 and the annular bladder or inner tube 21. The conductive member 218 is formed from metallic foil or mesh and serves to provide a path to ground for the RF energy.

The heat from the parabolic reflector 210 is focused primarily upon the edge junction of the tire tread 90, the cushion gum 88 and the tire carcass 216. It is in this edge junction that heat loss in the gum rubber can occur, causing improper vulcanizing of the gum rubber and contributing to edge lifting when the tire is removed from the process chamber. The heat from the heating element 202 eliminates such edge lifting and provides complete vulcanization of the cushion gum and of any excess cushion gum which may be present at this point.

Although it will be understood that various types of electrical heating elements may be utilized with the present invention, a Chromalox U-RAD-2 type 800 watt heating element has been found to work satisfactorily. RF chokes, not shown, are employed to prevent RF energy from flowing from the heating elements into the main electrical lines. The heating elements 200 and 202, and the remaining two heating elements not shown in FIG. 8, may be automatically positioned with the use of hydraulic cylinders, or may be manually positioned and locked in a desirable position adjacent a tire.

Figure 10:
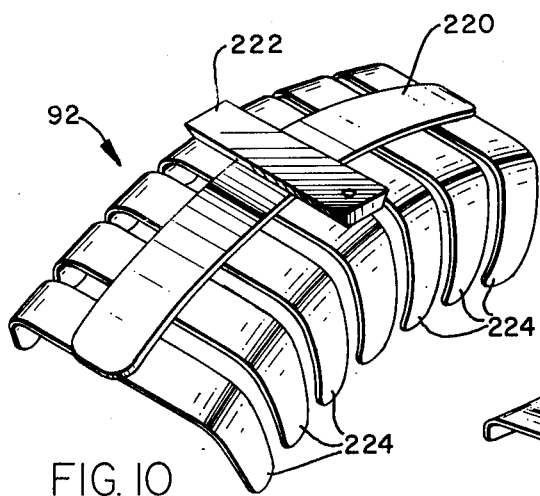
FIG. 10 is a perspective view of an embodiment of the RF antenna of the present invention.

It will be recognized that the RF antenna 92 of the present invention may take on several forms, depending upon the type of tire to be operated upon the desired curing characteristics. FIG. 10 illustrates an RF antenna 92 which has been found to provide good vulcanizing results. The antenna 92 comprises a spine support member 220 which is provided with a curve generally approximating the outer periphery of a vehicle tire. A cross support member 222 may be utilized to connect the RF antenna to the holder 94. The antenna portion comprises a plurality of generally U-shaped antenna members 224 which are fixedly mounted at spaced intervals along the underside of the spine 220. Each of the U-shaped members 224 are provided with a cross section generally approximating the outer cross section of a vehicle tire in order to provide uniform heating to all areas of the cushion gum layer desired to be vulcanized.

Figure 11:
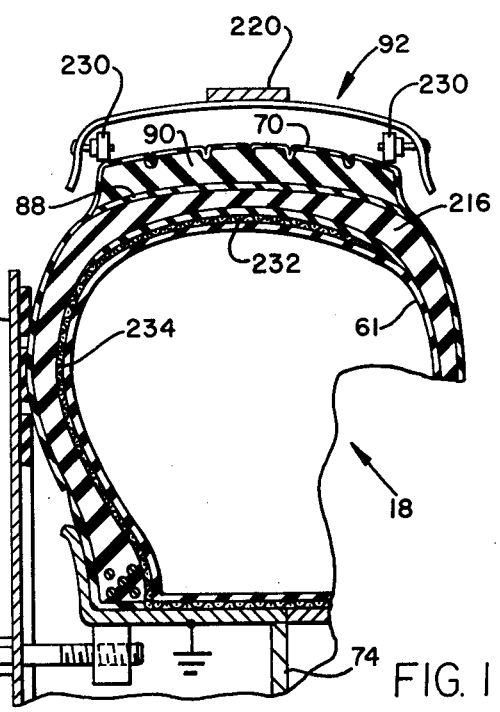
FIG. 11 is a sectional view of a tire and another embodiment of the RF antenna according to the present invention.

FIG. 11 illustrates a cross section of a typical tire utilized in conjunction with another embodiment of an RF antenna in accordance with the invention. Since many vehicle tires have irregular configurations, it is desirable in some instances to provide rollers 230 on opposite sides of the antenna in order to maintain antenna 92 at a predetermined distance from the exterior of the tire tread at all times. When such a configuration is utilized, a flexible coupling is provided between the antenna 92 and the upper antenna support members. Referring to FIG. 11, the rollers 230 roll against the outer portion of the tire, thereby assuring that the antenna is maintained at the desired distance from the tire.

FIG. 11 further illustrates the incorporation of an annular conductive member 232 within the inner tube 61, rather than to the exterior of said tube as shown in FIG. 9. The conductive member 232 is molded between two layers of the bladder 61 and is wholly encompassed about the outer annular periphery of the bladder 61, with the exception of several narrow conductive straps 234 which extend from spaced points along the conductive member 232. As shown, the straps 234 are interconnected to the grounded split tire hub member 74 connected to the tire in order to connect the conductive member 232 with circuit ground through the brush structure 80 previously described.

FIG. 11 illustrates the tire carcass 216, the uncured gum layer 88, the pre-cured tire tread 90 and the envelope 70. It will be understood that RF energy from the antenna 92 tends to heat the middle of the mass first. Thus, heat applied by the antenna 92 is concentrated in the vicinity of the uncured gum layer 88, thereby tending to vulcanize the gum layer 88 without causing deterioration of the tire carcass by excess heating of the carcass side walls and shoulder areas.

Figure 12:
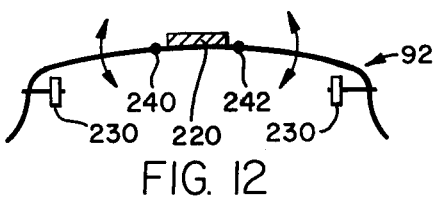
FIG. 12 is a somewhat diagrammatic illustration of yet another embodiment of the RF antenna according to the invention.

FIG. 12 illustrates another embodiment of the antenna 92 which may be constructed in an identical manner to that shown in FIG. 11, with the exception of the provision of two hinges 240 and 242. The antenna 92 may be constructed in the manner shown in FIG. 10, or in accordance with the other antenna configurations to be subsequently described. The non-conductive rollers 230 bear against the outer periphery of the tire and cause the outer hinged portions of the antenna to move upwardly or downwardly with respect to the spine 220. In this manner, the antenna may be disposed at a constant distance from the tire without the requirement of having an elastic mounting member disposed between the antenna and the rigid support structure.

Figure 13:
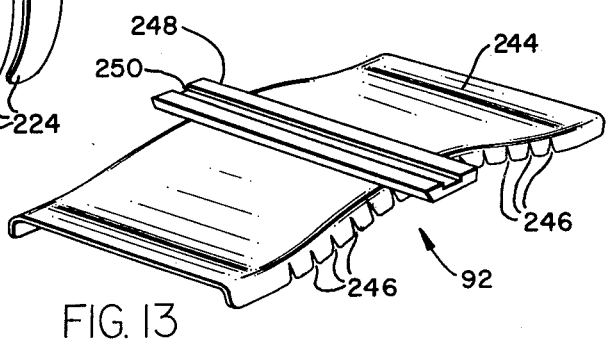
FIG. 13 is a perspective view of yet another embodiment of the RF antenna according to the present invention.

FIG. 13 illustrates yet another embodiment of the present antenna which includes an integral metal sheet 244 which is provided with a generally U-shaped cross section and a lengthwise curvature generally corresponding with the outer shape of a vehicle tire. Slots 246 are provided along the sides of the antenna in order to enable forming the antenna in the desired curved position. A cross member 248 is provided with a slot 250 which dovetails with the support member in order to enable the easy removal of the antenna when desired.

Figure 14:
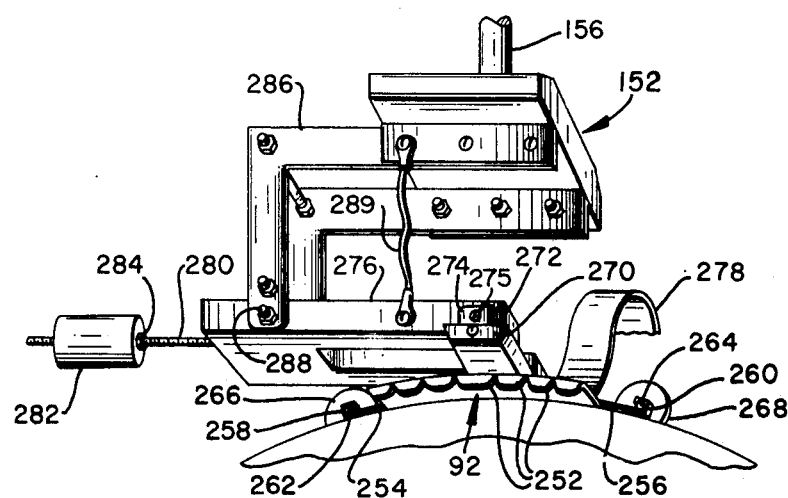
FIG. 14 is a perspective view of the preferred embodiment of the RF antenna.
Figure 15:
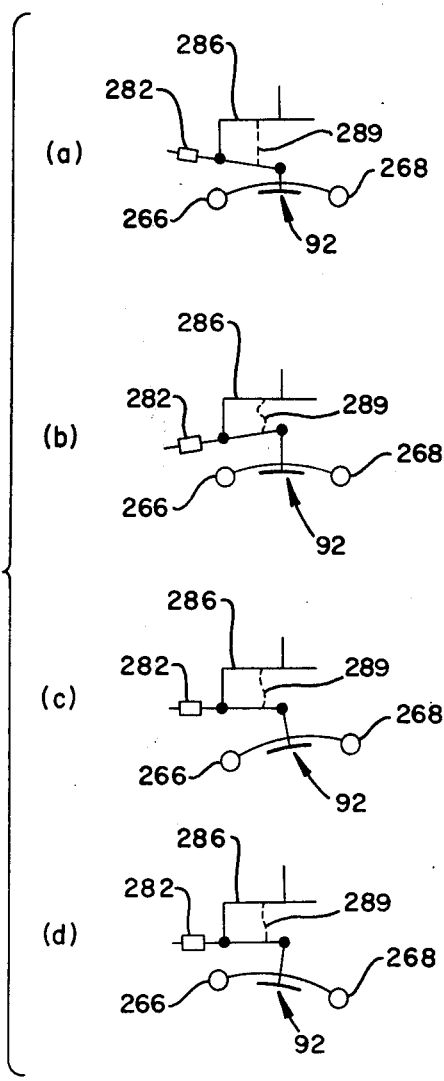
FIGS. 15a–15d are somewhat diagrammatic representations of various possible orientations of the RF antenna shown in FIG. 14.

FIGS. 14 and 15 illustrate the preferred embodiment of the present antenna. In this embodiment, the antenna 92 again comprises an integral sheet of metal having a generally U-shaped cross section and having slots 252 formed along the side flanges thereof to enable forming the antenna in a curved lengthwise configuration. Non-conductive wheel mounting brackets 254 and 256 are attached as by bolting or the like to the opposite ends of the antenna 92 and include feet 258 and 260 for attaching to non-conductive axles 262 and 264. Wheels 266 and 268 are also non-conductive and are mounted for rotation on the axles 262 and 264 and are adapted to abut with the periphery of the vehicle tire assembly in order to maintain the antenna 92 a predetermined distance from the exterior of the tire assembly regardless of deviations in the shape of the tire within the assembly.

An antenna cross support 270 is connected across the antenna and interfits with an antenna mounting dovetail 272. The upper portion of the dovetail is a mounting bracket 274 which pivotally attaches at pivots 275 to an insulating yoke 276. As may be seen, yoke 276 has a generally U-shaped configuration and interconnects to bracket 274 at the end of each leg. A flexible RF feed member 278 is connected to the edge of the antenna mounting dovetail 272 in order to apply RF energy to the antenna.

A rod 280 is connected to the other end of the insulating yoke 276 and includes an adjustable counterweight 282. The counterweight includes nuts 284 at either end thereof to enable selective adjustment of the counterweight 282 at any desired location along the rod 280. A bifurcated rigid support 286 is provided with an L-shaped cross section and is connected at its lower end to insulating yoke 276 by a pivot 288. The rigid support 286 is connected to the antenna support 152 which is connected to the cylinder rod 156 in the manner previously described. A retaining strap 289 is connected between the rigid support and the insulating yoke 276 in order to enable the antenna 92 to be lifted completely clear of the tire to load and unload the tire.

With the use of the preferred embodiment of the antenna, the antenna may assume a variety of different configurations relative to the tire in order to accommodate various deviations in the shape of the tire. FIGS. 15a—15d illustrate various configurations which may be taken by the present antenna. Referring to FIG. 15a, the antenna 92 is shown in its lowermost position when the antenna is lifted completely free from contact with the tire when it is desired to load or unload the tire. In this configuration, the weight of the antenna 92 is greater than the counterweight 282.

FIG. 15b illustrates the antenna 92 when the antenna 92 is in contact with a relatively large diameter tire.

FIG. 15c illustrates the antenna 92 in a position canted to the right in order to accommodate a deformation in the vehicle tire. In this position, the counterweight 282 is shown in a generally horizontal position which is normal when the antenna 92 is riding on the surface of a tire.

FIG. 15d illustrates the antenna 92 in a position canted to the left in order to accommodate a deformation in a vehicle tire. In this position, the counterweight 282 is also maintained in a horizontal position. In the position shown in FIGS. 15b—15d, the restraining strap 289 is in a non-extended position.

Figure 16:
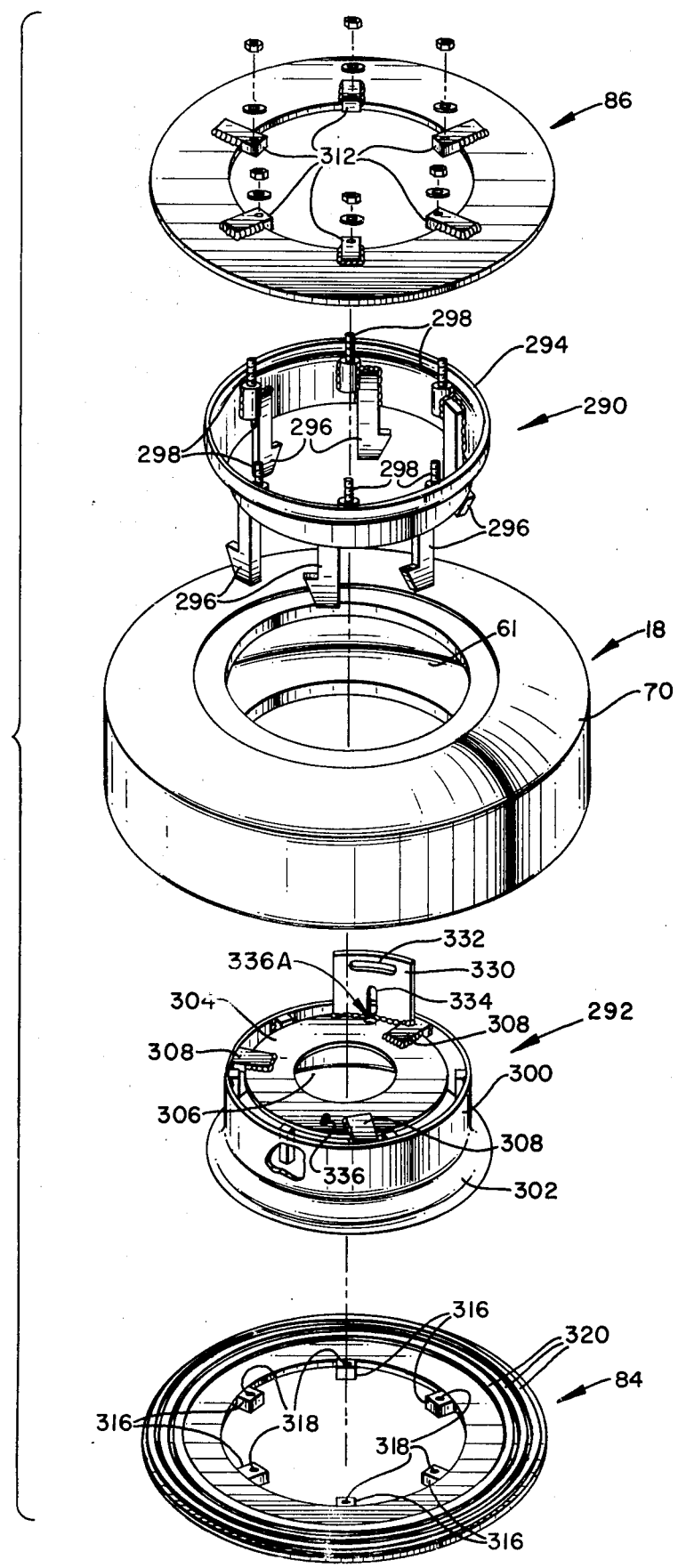
FIG. 16 is an exploded view of the split hub assembly which attaches to the center portion of a tire carcass in accordance with the invention.

FIG. 16 illustrates an exploded view of the hub assembly of the present invention. The tire assembly 18 includes the inner tube 61 previously described, along with the exterior flexible shield or envelope 70. The hub assembly comprises a first hub member 290 and a second hub member 292. Member 290 includes an annular member 294 including six downwardly projecting hook members 296 depending therefrom at spaced locations. Additionally, six bolts 298 extend upwardly from the annular ring 294.

The second hub member 292 includes an annular ring 300 joined at one edge to circular plate 302. A circular member 304 includes a center cutout 306 and is joined to the ring 300 by three flanges 308 by welding or the like. In assembly, the two hub members 290 and 292 are disposed on opposite sides of the tire 18 as illustrated and the hub member 290 is rotated clockwise in order to engage the six hook members 296 under six locking blocks which are attached inside split hub 292 by welding or the like in order to lock the hub members together.

The first annular plate 86 (FIG. 2) includes six inwardly directed projections 312, each having a bolt aperture therein. The annular plate 86 is then fitted over the hub member 290 such that the bolts 298 extend through the holes in projections 312. Suitable nuts are then tightened over the bolts 298 to firmly attach the annular plate 86 in order to press against the side walls of the flexible shield 70.

A second annular plate 84 (FIG. 2) also includes six inwardly directed projections 316 each of which have bolt holds 318. Annular grooves 320 are formed on the inner side of the annular plate 84. Bolts, not shown, extend from the underside of the plate 302 and are received within the bolt holes 318. Suitable nuts attach to the bolts in order to tightly secure the annular plate 84 to the other side of the tire assembly 18. The grooves 320 assist in sealing the inner edge of the shield 70. Similar grooves are provided on the inner side of the annular plate 86. If desired, grooves 320 may contain O ring seals or gaskets.

An extension plate 330 is welded to circular member 304 and includes a transverse slot 332. Extension 330 and slot 332 are used by the lifting mechanism shown in FIGS. 17 and 18 in order to automatically lift the tire into the chamber 12.

A slot 336 is formed through circular member 304 and a hole 336A is provided in the opposite side of slot 336. Both slot 336 and hole 336A are used to lock the split hub assembly 292 to the ground ring 76 shown in FIG. 2. A dowel pin 76A (FIG. 2) extends through hole 336A. The vertical slot 334 in member 330 is used as clearance for dowel pin 76A as it comes through from the back side of circular member 304.

Figure 17:
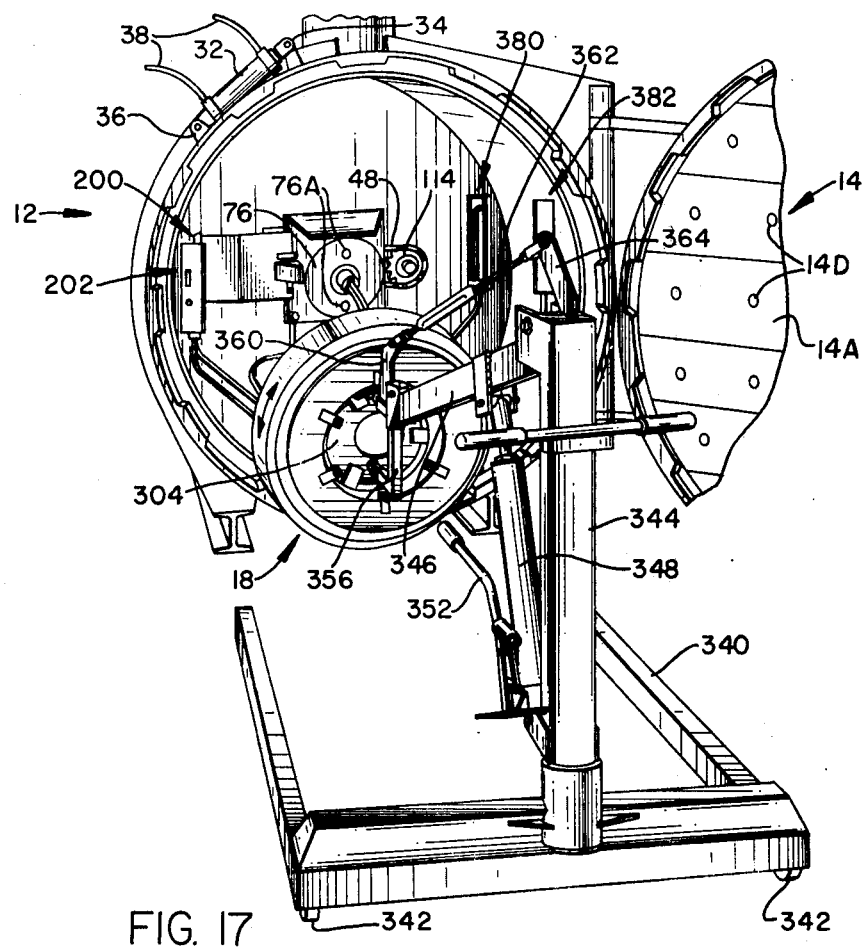
FIG. 17 is a perspective view of a tire lift mechanism used in conjunction with the present RF pressure chamber.
Figure 18:
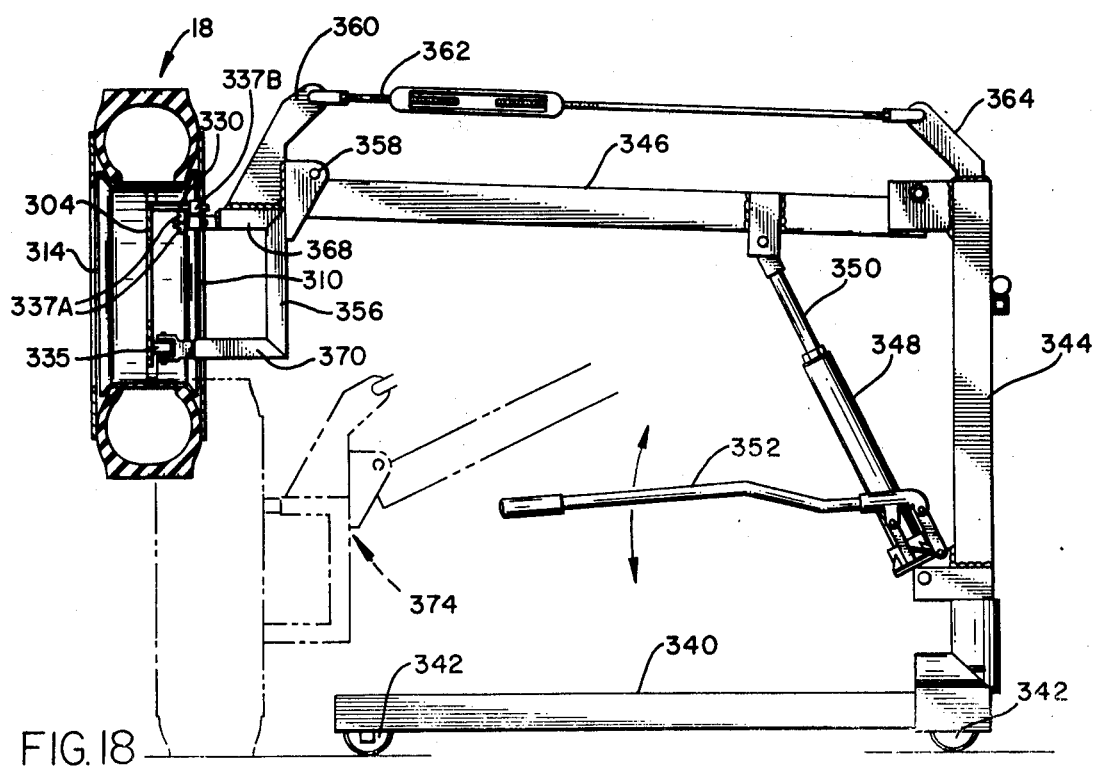
FIG. 18 is a side view representing two positions of the tire lifting mechanism shown in FIG. 7.

FIG. 17 illustrates the two heating elements 200 and 202, and also illustrates two other electrical heating elements 380 and 382. FIGS. 17 and 18 also show the lifting mechanism which comprises a U-shaped base 340 having wheels 342 mounted on the underside thereof. A pedestal 344 is mounted on base 340 and is pivotally connected at the upper end thereof to a cantilevered crane member 346. A lift cylinder 348 is pivotally attached at its lower end to the pedestal 344 and includes a rod 350 attached at its upper end to the cantilevered crane member 346. A handle 352 may be manually operated in order to operate the cylinder 348 in a manner to lift the crane member 346.

The lift mechanism thus described is somewhat similar to the knock-down hoist described and claimed in U.S. Pat. No. 3,521,860 by Zehrung, Jr. et al.

However, the present lifting mechanism is modified in order to particularly be adapted for automatically lifting a vehicle tire. First, a specially designed generally U-shaped lift member 356 is pivotally connected to the end of the cantilevered crane arm 346 at pivot point 358. An ear 360 is upstanding from the lift member 356. An adjustable rod 362 is connected at one end to the ear 360 and at the other end to an ear 364 upstanding from the pedestal 344.

The U-shaped lifting member 356 includes an upper horizontal arm 368 and a lower horizontal arm 370. Arm 370 is somewhat longer than arm 368. Upper arm 368 has a roller 337B that fits into the slot 332 in extension 330 extending from the hub assembly. Two other vertical rollers 337A are provided on opposite sides of roller 335 to enable rotation of the tire. The end of arm 370 also includes a horizontal roller member 335 adapted to roll on the surface of the circular member 304 to enable rotative adjustment of the tire so that the tire can be aligned with dowel pin 76A.

In operation of the lifting mechanism shown in FIGS. 17 and 18, the mechanism is initially moved to the downward position illustrated generally by the dotted line position identified by the dotted arrow 374. In this position, the tire is placed in its first position and the lift mechanism 356 is interconnected therewith as shown. The handle 352 is then manually pumped in order to cause the cylinder 348 to lift the crane arm 346 to the horizontal position. The assembly may then be rolled on wheels 342 in order to position the tire 18 within the chamber in the manner shown in FIG. 17, thereby engaging the dowel pins 76A mounted in the grounding ring 76 with slot and hole 336 and 336A located in member 304. After the wheel has been mounted on the shaft within the chamber, the crane arm 346 is slightly lowered and then withdrawn from the chamber.

Figure 19:
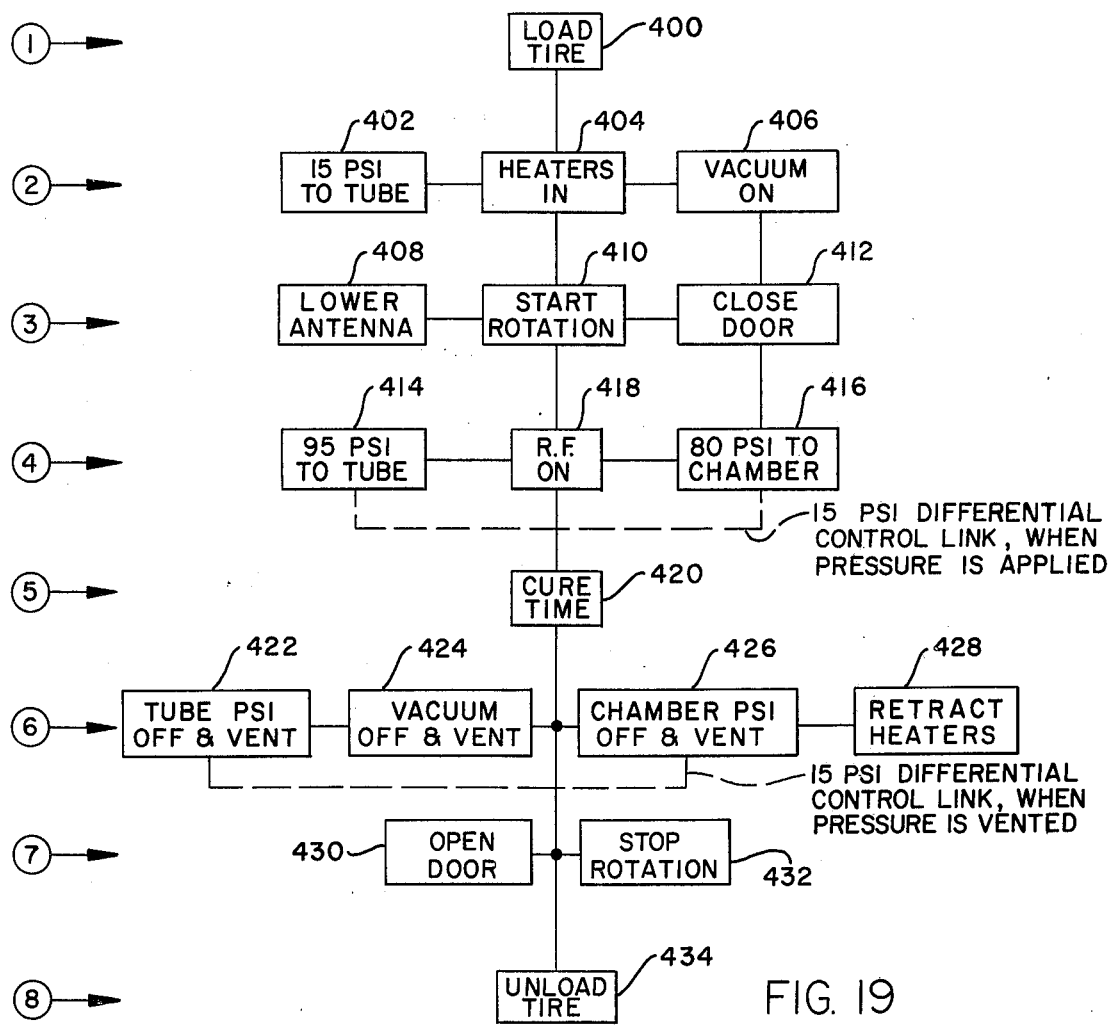
FIG. 19 is a block diagram of the various operation steps of the present tire retreading process.

FIG. 19 illustrates a block diagram of the various steps of operation of the present method. A tire to be retreaded is first prepared by buffing off the old tread. The resulting buffed carcass is then coated with a tack cement and the cement is allowed to dry. A pre-cured tire tread is then cut to length in accordance with the size of the tire carcass. The back side of the pre-cured tread is also covered with tack cement and allowed to dry. A cushion gum sheet is then cut to the length of the previously cut pre-cured tread. The cut cushion gum layer is applied to the back of the pre-cured tread and the now dry tire carcass is mounted on a conventional tire spreader. The spreader spreads the side walls and rim beads away from each other to enable application of the cushion gum and tire tread. The cushion gum and tread assembly are then applied about the outside of the tire carcass and the entire tire assembly is then mounted on a conventional tire rolling machine. The tire rolling machine then rolls out most air trapped between the cushion gum layer and the pre-cured tread and carcass.

The tire assembly is then withdrawn from the tire rolling machine and the RF grounding strip of the present invention is mounted on the inside of the tire carcass. An inner tube is then applied within the tire. The outside envelope 70 is then mounted over the tire assembly and the entire assembly is mounted on the special split rim hub assembly of the invention as shown in FIG. 16. The tire is loaded into the chamber at time interval 1 at step 400 (FIG. 19). The loading of the tire at step 400 includes orienting the tire on the rotatable shaft and attaching the nut 20 to lock the tire on the shaft 44, then connecting the air pressure and vacuum conduits extending from the shaft 44 to the locations on the tire.

At time interval to in FIG. 19, air pressure is applied through conduit 22 to the inner tube at step 402 until 15 psi pressure is applied to the inner tube. The electrical heating elements 200, 202, 380 and 382 are then moved to the desired distance adjacent the tire at step 404. The vacuum pump 63 is energized and vacuum is applied via conduit 24 at step 406.

At time interval 3, the antenna 92 is lowered to the desired position at step 408. The shaft 44 is rotated at step 410 and the chamber door 14 is closed at step 412. While various speeds of rotation will be provided, a rotation speed of approximately 36 rpm has been found to work advantageously.

A time interval 4, pressure is additionally applied to the inner tube 61 until approximately 95 psi is reached at step 414. Simultaneously, pressure is applied to the interior of the chamber 12 at step 416 until approximately 80 psi has been applied. It is important that greater pressure is applied to the inner tube 61 than to the chamber 12 to prevent collapse of the tire. While various pressures will be utilized for the chamber and for the inner tube according to various desired operating characteristics, in the preferred embodiment approximately 15 additional psi is applied to the inner tube than to the chamber 12.

At step 418, RF energy is applied to the antenna 92 and RF energy is continually applied to the rotating tire during time interval 5 at step 420 until the cushion gum is vulcanized. The cure time at step 420 will vary in accordance with the ply and size of the tire, but will be much shorter than conventional tire retreading techniques.

During the curing time at step 420, the RF energy flows from the antenna 92 through the tire assembly to the grounded conductive member 218 (FIG. 9). This action creates heat build up at the approximate area of the cushion gum layer across the full width of the pre-cured tread, and flows up and down into the tire tread section and tire casing. Because there is less rubber compound in the tire casing because of tire cord displacement, the heat is generally not as great in the tire casing area as in the tread. Because there is less rubber compound in the tire tread on the outside because of the tread groves displacement, the heat is generally greater at the surface closest the gum rubber. The spinning of the tire assembly provides the tire with a continually moving bath of RF energy applied to a small area of rubber at a time. This enables the heat time to flow to the far edges of the tire tread to enable complete vulcanization of the cushion gum layer. Of course, by changing the revolution speed of the tire, the time spent under the RF antenna of a given area may be adjusted as desired. The level of the RF energy applied to the antenna 92 may also be adjusted at will for different size tires.

At time interval 6 shown in FIG. 19, when it is determined that the tire has been cured, the pressure applied to the inner tube 61 is terminated and the pressure is vented at step 422. In addition, the vacuum is turned off and vented at step 424. The chamber pressure is turned off and is vented at step 426 to the atmosphere. During venting of the pressure out of the inner tube and out of the chamber, the pressure within the inner tube is always maintained greater than that of the chamber to prevent collapse of the tire. The electrical heating elements are retracted at step 428.

At time interval 7, the door 14 is opened at step 430 and rotation of the shaft 44 is terminated at step 432. The tire is unloaded at step 434. The envelope 70 is removed from the tire, along with the split hub assembly, the inner tube and the RF ground strip. After cooling, the tire is ready to be used.

Figure 20:
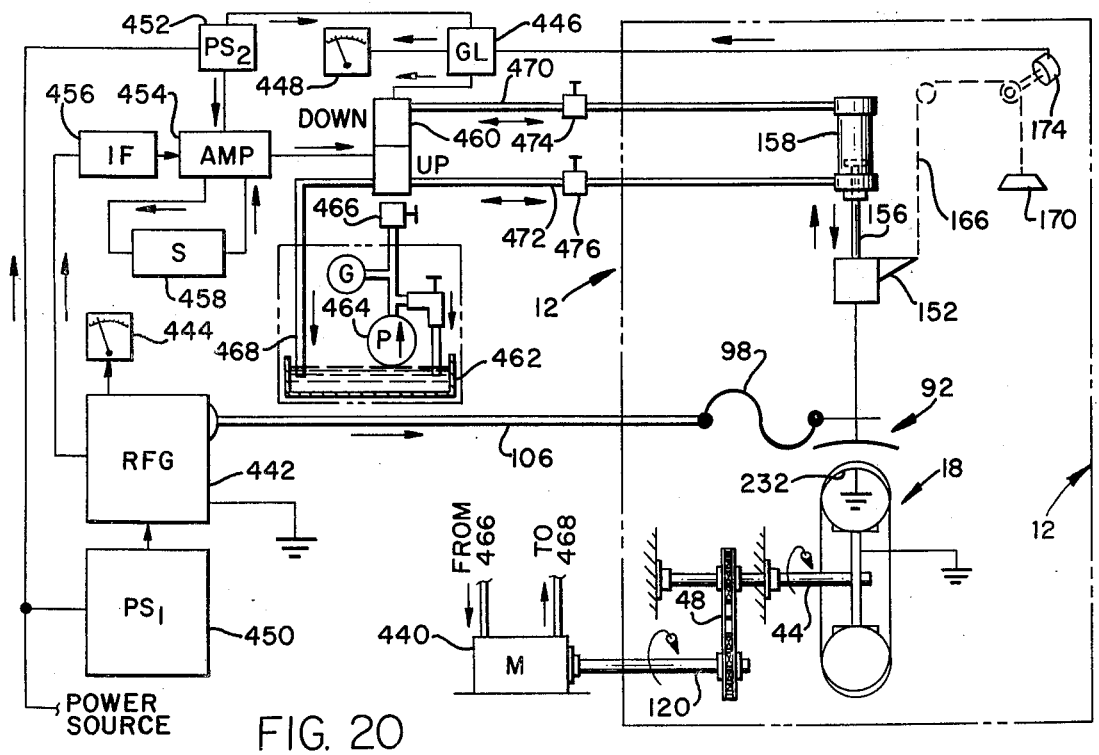
FIG. 20 is a schematic diagram of an automated system in accordance with the present invention.

While it is possible to operate the present system manually by manually operating various valves and switches at the desired sequence, it is possible to automate the present system in the manner shown in FIG. 20. The chamber 12 is denoted by the dotted line and includes rotating shaft 44 on which is mounted the tire assembly 18 as previously described. The RF ground strip conductive layer 218 is shown grounded. The drive shaft 120 extends through the housing of the chamber to a hydraulic motor 440, as previously described. The chain 48 transmits energy rotation from the shaft 120 to the shaft 44. RF energy is applied via the feed member to the RF antenna 92. The RF energy is generated from the RF generator 442, the work load of which is indicated by a plate load meter 444 mounted on the housing 42.

The bracket 152 is connected to the chain 166 in a manner previously described. The counterweight 170 is connected to the end of the chain. Movement of the chain causes operation of the potentiometer 174 as previously described. The output of potentiometer 174 is applied through a gap limit selector 446 to a meter 448. A power supply 450 is connected to receive power from a power source and to apply power to energize the RF generator 442. Power is also applied through a secondary power supply 452 which provides the power to operate the RF gap limit selector 446 and applies power to an amplifier 454. The output from the RF generator 442 plate load circuit is applied through an interface 456 to the amplifier 454, the output of which is applied to a selector unit 458 and which provides an output control signal to an up/down servo valve 460.

A fluid reservoir 462 contains a suitable hydraulic fluid which may be applied by a pump 464 through a regulator 466 to the servo valve 460. Return fluid is applied through a return line 468 to the reservoir 462. Hydraulic fluid is applied from the servo valve 460 through either of the lines 470 or 472 through control valves 474 and 476 to operate the fluid to cylinder 158 in order to move the fluid cylinder rod 156 up or down.

In operation of the control circuitry, closing of the door 14 energizes the motor 440 to begin rotation of the shaft 44. Closing of the door also lowers the antenna and applies power to the power source 450 and 452 in order to energize the RF generator 442. RF energy is then applied through the power output feed 106 to the antenna 92. Previously, the desired gap between the RF antenna 92 and the tire has been input through operator selection into the gap limit selector 446. The output of the potentiometer 174 which is representative of the position of the antenna 92 is applied to the gap limit selector 446 which generates an error signal, if the gap is not correct, to the servo valve 460.

An output from the plate load circuit of the RF generator 442 is applied to the interface 456 and to the amplifier 454, which compares the input previously applied to the selector 458 of a tire of the same make, model and size for the desired RF energy to be applied to the tire to be vulcanized. If the energy is not as desired, an error signal is generated from the amplifier 454 in order to control, in combination with the gap limit selector 446, the servo valve 460. Serve valve 460 thus operates to apply fluid either to line 470 or 472 in order to raise or lower the antenna 92 as desired, this thereby raises and lowers the amount of RF energy applied to the tire until the desired level is reached. Feedback is provided to the control system via the potentiometer 174 and via the output of the RF generator plate load circuit.

If desired, temperature probes may be inserted into the tire assembly 18 in series with RF chokes in order to provide an indication of the interior temperatures thereof, via slip rings mounted on shaft 44. These interior temperatures may be utilized to further control the system by terminating application of RF energy when the desired temperature is reached and thereby temperatures are maintained for a predetermined time at a predetermined level.

It may thus be seen that the present invention provides a system for vulcanizing a pre-cured tire tread onto a tire carcass in a minimum of time but with absolute safety. The present invention enables quick vulcanizing and retreading of a tire, without the requirement of a steam boiler and excessive energy requirements.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for retreading tires comprising:
    a. a chamber dimensioned to receive at least one tire having an uncured gum layer and a pre-cured tread disposed about the outer periphery thereof,
    means for pressurizing the interior of said chamber,
    an antenna disposed within said chamber adjacent the outer periphery of the tire,
    means for rotating the tire such that the periphery of the tire cyclically passes said antenna,
    means for applying RF energy to said antenna such that the uncured gum layer around the tire is heated sufficiently to become vulcanized to affix the pre-cured tread to the tire, and
    means associated with the tire for providing an RF energy path to ground.

2. The system of claim 1 wherein said means for providing an RF energy path to ground comprises:
    a grounded conductive member disposed about the inner periphery of the tire.

3. The system of claim 1 and further comprising:

a horizontal axle for receiving and supporting said tire within said chamber in a vertical plane, and means for rotating said axle at a predetermined speed.

4. The system of claim 3 and further comprising:
a passageway formed through said axle for receiving pressurized air, and
means connecting said passageway to the tire mounted on said axle.

5. The system of claim 3 and further comprising:
an annular shield for fitting over the tire,
a passageway formed through said axle for receiving a vacuum, and
means connecting said passageway between the tire and the shield in order to remove air and moisture from between the tire and the shield.

6. The system of claim 1 and further comprising:
means for accurately adjusting the position of said antenna relative to the outer periphery of the tire.

7. The system of claim 6 wherein said means for adjusting comprises a fluid cylinder.

8. The system of claim 1 and further comprising:
electrically energized sources of heat located within said chamber for directing focused heat against the edge of the gum layer.

9. The system of claim 1 wherein said antenna comprises a conductive member having radiating surfaces for being disposed generally parallel to the peripheral portion of the tire.

10. The system of claim 1 wherein the frequency of said RF energy is approximately 25 Megacycles.

11. A system for vulcanizing an uncured gum layer disposed between a vehicle tire carcass and a pre-cured tire tread comprising:
an annular air bladder for being received within the tire carcass,
a hub housing for being received within the center opening of the tire carcass,
a chamber capable of withstanding high pressures and dimensioned to receive the vehicle tire carcass,
a shaft rotatably and horizontally disposed in said chamber for receiving said hub housing,
means extending through the wall of said chamber for rotating said shaft,
means for pressurizing the interior of said chamber,
an antenna extending from said chamber to a position adjacent the tire tread,
a source of RF energy located outside said chamber,
means connecting said RF source through the wall of said chamber to said antenna such that RF energy is directed through the tire tread to heat the gum layer to an extent sufficient to vulcanize the tire tread to the tire carcass, and
means associated with the tire carcass for providing a path to circuit ground for said RF energy generated from said antenna.

12. The system of claim 11 and further comprising:
means extending through the wall of said chamber for pressurizing said air bladder.

13. The system of claim 11 and further comprising:
a conductive layer formed about the perimeter of said air bladder and connected to circuit ground.

14. The system of claim 11 and further comprising:
a flexible annular cover member fitting over the exterior of the tire tread to prevent pressurized air from lifting the edges of the tire tread away from the tire carcass.

15. The system of claim 11 wherein said antenna is disposed in the upper portion of said chamber and further comprising:
a housing extending upwardly from the top of said chamber,
a fluid cylinder disposed in said housing and connected to said antenna, and
means for operating said fluid cylinder to accurately position said antenna adjacent the tire tread.

16. The system of claim 15 and further comprising:
a potentiometer connected to be moved proportionately to movement of said antenna, and
a meter connected to said potentiometer to enable positioning of said antenna.

17. The system of claim 11 wherein the cross section of said antenna corresponds to the shape of the tire tread.

18. The system of claim 17 wherein said antenna comprises:
a plurality of generally U-shaped members aligned and spaced apart from one another.

19. The system of claim 17 wherein said antenna comprises:
end portions hinged to a center portion, and means on said end portions bearing against the tire tread to maintain a uniform spacing between said antenna and the tire tread.

20. The system of claim 17 wherein said antenna comprises:
an integral conductive sheet having opposed edge portions bent downwardly to form a U-shaped cross section, said sheet being curved in the middle portion thereof to generally conform to the periphery of the tire tread.

21. The system of claim 11 and further comprising:
electrically energized heating elements pivotally mounted in the bottom portion of said chamber and movable adjacent the edges of the tire tread.

22. The system of claim 11 and further comprising:
a passageway extending through said shaft and communicating with said air bladder, and
means for applying pressurized air to said passageway to inflate said air bladder.

23. The system of claim 11 and further comprising:
an annular shield for fitting about the tire tread and the tire carcass,
a passageway extending through said shaft and communicating with the space between said shield and the tire carcass, and
means for applying vacuum to said passageway for removing air from between the shield and the tire carcass.

24. A system for vulcanizing an uncured gum layer disposed between a vehicle tire carcass and a pre-cured tire tread comprising:
a chamber capable of withstanding high pressures and including a pivotal side door,
an axle centrally located in said chamber and mounted for horizontal rotation therein,
a drive shaft extending through the side wall of said chamber and spaced from said axle,
means exterior of said chamber for rotating said drive shaft,
means within said chamber for transferring rotation of said drive shaft to said axle,
a hub assembly adapted to be secured to the interior of the vehicle tire carcass and including structure for being affixed to the end of said axle, such that the tire carcass is vertically oriented, means for pressurizing the interior of said chamber, an antenna disposed within said chamber from the top of said chamber and including means for selectively positioning said antenna adjacent the tire tread, a source of RF energy located exterior of said chamber, means for feeding said RF energy from said source through the side walls of said chamber to said antenna, wherein RF energy is applied from said antenna through the tire tread to heat the gum layer sufficiently to vulcanize the tire tread to the tire carcass, and means associated with said antenna for providing a path to circuit ground for the RF energy generated from said antenna.

25. The system of claim 24 and further comprising:
a source of pressurized air, and
means for applying said pressurized air through the walls of said chamber to the tire carcass interior in order to pressurize the interior of the tire carcass during rotation thereof within saidd chamber.

26. The system of claim 24 and further comprising:
an annular bladder disposed within said tire carcass,
a conductive annular member disposed between said bladder and said tire carcass,
means for connecting said annular member to said hub assembly, and
brush means affixed to said chamber and connected to circuit ground and operable to brush against said hub assembly during rotation of said tire carcass in order to connect said conductive annular member to circuit ground.

27. The system of claim 24 wherein said hub assembly comprises:
a first hub member having a diameter approximating the internal diameter of said tire carcass and having a central opening for receiving the end of said axle,
a second hub member having projections extending therefrom at spaced locations around the perimeter thereof, hook means affixed to the ends of said projections and operable to be abutted with portions of said first hub member, and
annular side wall members for being connected to said hub members for bearing against the side wall portions of said tire carcass.

28. The system of claim 24 and further comprising:
means for automatically controlling the sequence and duration of operation of said means for rotating, means for pressurizing and said source of RF energy in order to retread a tire of specific dimensions.

29. The system of claim 24 wherein the RF energy applied to said antenna has a frequency of approximately 25 Megacycles.

30. An antenna for applying RF energy to a rotating tire within a pressurized chamber comprising:
an antenna element having a configuration to generally conform with a portion of the outer periphery of the rotating tire,
wheel means attached to the said antenna for abutting with the rotating tire in order to maintain said antenna a predetermined distance from the outer periphery of the rotating tire,
means connected with said antenna and extending through the walls of the chamber for applying RF energy to said antenna,
an insulating member pivotally connected to said antenna on the opposite side of said antenna from the rotating tire, and
a support member pivotally attached to said insulating member and disposed to support said antenna within the chamber.

31. The antenna of claim 30 wherein said insulating member is pivotally connected to said support member at a location spaced from the pivotal connection of said antenna, and
a counterweight attached to said insulating member at an end of said insulating member remote from the pivotal connection of said antenna.

32. The antenna of claim 30 and further comprising retaining means connected between said insulating member and said support member to maintain said insulating member in a generally horizontal position when said antenna is moved away from contact with the tire.

33. The antenna of claim 30 wherein said support member is attached to a fluid pressure cylinder for enabling adjustment of the position of said antenna.

34. The antenna of claim 30 wherein said insulation member has a yoke configuration and is pivotally connected to said antenna at the outer ends of said yoke configuration.

35. The method of retreading tires comprising:
removing an old tread from a tire casing,
applying a length of uncured cushion gum about the outer periphery of the tire casing,
applying a length of a pre-cured tread about the outer periphery of the cushion gum,
positioning an RF grounding member about the inner periphery of the tire casing,
positioning an inner tube within the tire casing,
mounting the tire casing on a hub,
mounting the hub on an axle within a pressure chamber,
pressurizing the pressure chamber,
rotating the axle to rotate the tire casing within the pressure chamber, and
applying RF energy to an antenna fixedly disposed adjacent the rotating tire casing, said RF energy having a magnitude sufficient to vulcanize the cushion gum in order to vulcanize the pre-cured tire tread to the tire casing.

36. The method of claim 35 and further comprising:
pressurizing the inner tube inside the air pressure chamber.

37. The method of claim 35 and further comprising:
mounting a flexible annular shield around the outer periphery of the pre-cured tread prior to rotating the tire casing within the pressure chamber.

38. The method of claim 37 and further comprising:
applying a source of vacuum between the shield and the tire casing.

39. The method of claim 35 and further comprising:
connecting the RF grounding member to circuit ground during rotation of the tire casing.

40. The method of claim 35 and further comprising:
varying the distance between the antenna and the outer periphery of the tire casing in order to adjust the amount of heat applied to the cushion gum.

41. The method of claim 35 and further comprising:
varying the position of the antenna during rotation of the tire casing such that the spacing of the antenna from the outer periphery of the tire casing is maintained constant during rotation of the tire casing.

42. The method of claim 35 and further comprising:
applying heat from electrically energized elements within the pressurized chamber to localized areas of the rotating tire casing.

43. The method of claim 35 and further comprising:
automatically controlling the sequence and duration of the steps of pressurizing, rotating and applying RF energy.

44. The method of claim 35 and further comprising:
pressurizing the interior of the inner tube to a greater extent than the interior of the chamber in order to prevent collapse of the tire.

45. The method of claim 35 and further comprising:
dissipating DC static charge on the antenna by conducting the static charge through an RF choke and across a spark gap to circuit ground.

46. A system for retreading tires comprising:
means for supporting at least one tire having an uncured gum layer and a pre-cured tread exposed about the outer periphery thereof,
means for surrounding the tire, gum layer and pre-cured tread for exerting continuous pressure against the pre-cured tread to maintain it in place about the outer periphery of the tire,
an antenna disposed adjacent the outer periphery of the pre-cured tread,
means for rotating said antenna and the tire relative to one another such that said antenna cyclically scans the periphery of the pre-cured tread,
means for applying RF energy to said antenna such that the uncured gum layer around the tire is heated sufficiently to become vulcanized to affix the pre-cured tread to the tire, and
means associated with the tire for providing an RF energy path to circuit ground.

47. A method of retreading tires comprising:
removing an old tread from a tire casing,
applying a length of uncured cushion gum about the outer periphery of the tire casing,
applying a length of a pre-cured tread about the outer periphery of the cushion gum,
positioning an inner tube within the tire casing,
mounting the tire casing on a hub,
mounting the hub such that the periphery of the pre-cured tread is adjacent an RF antenna,
rotating the pre-cured tread and the RF antenna relative to one another while maintaining continuous pressure against the pre-cured tread to the tire casing,
applying RF energy to said antenna of a magnitude sufficient to vulcanize the cushion gum in order to vulcanize the pre-cured tire tread to the tire casing, and
providing an RF energy path from the tire casing to circuit ground.

* * * * *

UNITED STATES PATENT AND TRADEMARK OFFICE
CERTIFICATE OF CORRECTION

PATENT NO. : 4,123,306

DATED : October 31, 1978

INVENTOR(S) : Robert G. Landry

It is certified that error appears in the above-identified patent and that said Letters Patent are hereby corrected as shown below:

Column 8, line 47, change "is" to --in--;
Column 14, line 21, change "to" to --2--;
Column 16, line 18, change "Serve" to --Servo--;
Column 19, line 25, change "saidd" to --said--.

Signed and Sealed this

Seventeenth Day of April 1979

[SEAL]

Attest:

RUTH C. MASON
Attesting Officer

DONALD W. BANNER
Commissioner of Patents and Trademarks